United States Patent
Meyyappan

(10) Patent No.: US 8,333,810 B1
(45) Date of Patent: Dec. 18, 2012

(54) CARBON NANOTUBE TOWER-BASED SUPERCAPACITOR

(75) Inventor: Meyya Meyyappan, San Jose, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 481 days.

(21) Appl. No.: 12/398,854

(22) Filed: Mar. 5, 2009

(51) Int. Cl.
*H01G 9/00* (2006.01)
(52) U.S. Cl. .................................... 29/25.03
(58) Field of Classification Search ............... 29/25.03
See application file for complete search history.

(56) References Cited

U.S. PATENT DOCUMENTS

| | | |
|---|---|---|
| 6,454,816 B1 | 9/2002 | Lee et al. |
| 6,682,677 B2 | 1/2004 | Lobovsky et al. |
| 6,764,628 B2 | 7/2004 | Lobovsky et al. |
| 7,056,455 B2 | 6/2006 | Matyjaszewski et al. |
| 7,061,749 B2 | 6/2006 | Liu et al. |
| 7,199,997 B1 | 4/2007 | Lipka et al. |
| 7,211,350 B2 | 5/2007 | Amatucci |
| 7,247,290 B2 | 7/2007 | Lobovsky et al. |
| 7,435,476 B2 | 10/2008 | Viswanathan et al. |
| 7,466,539 B2 | 12/2008 | Dementiev et al. |
| 2006/0233692 A1 | 10/2006 | Scaringe et al. |
| 2008/0010796 A1* | 1/2008 | Pan et al. ............ 29/25.03 |

OTHER PUBLICATIONS

Wang, et al., Nucleation and growth of well-aligned, uniform-sized carbon nanotubes by microwave plasma chemical vapor depositon, Applied Physics Letters, Jun. 18, 2001, 4028-430, 78-25, American Institute of Physics.
Park, et al., Synthesis of carbon nanotubes on metallic substrates by a sequential combination of PECVD and thermal CVD, Carbon, 2003, 1025-1029, 41, 2002 Elsevier Science Ltd.
Hiraoka, et al., Synthesis of Single- and Double-Walled Carbon Nanotube Forests on Conducting Metal Foils, Journal of American Chemical Society, Sep. 22, 2006, 13338-13339, 128, 2006 American Chemical Society.
Masarapu, et al., Direct Growth of Aligned Multiwalled Carbon Nanotubes on Treated Stainless Steel Substrates, Langmuir, Jul. 17, 2007, 9046-9049, 23, 2007 American Chemical Society.

* cited by examiner

*Primary Examiner* — Seahvosh Nikmanesh
(74) *Attorney, Agent, or Firm* — John F. Schipper; Robert M. Padilla

(57) ABSTRACT

A supercapacitor system, including (i) first and second, spaced apart planar collectors, (ii) first and second arrays of multi-wall carbon nanotube (MWCNT) towers or single wall carbon nanotube (SWCNT) towers, serving as electrodes, that extend between the first and second collectors where the nanotube towers are grown directly on the collector surfaces without deposition of a catalyst and without deposition of a binder material on the collector surfaces, and (iii) a porous separator module having a transverse area that is substantially the same as the transverse area of at least one electrode, where (iv) at least one nanotube tower is functionalized to permit or encourage the tower to behave as a hydrophilic structure, with increased surface wettability.

8 Claims, 1 Drawing Sheet

CARBON NANOTUBE TOWER-BASED SUPERCAPACITOR

ORIGIN OF THE INVENTION

This invention was made, in part, by an employee of the U.S. government. The U.S. government has the right to make, use and/or sell the invention described herein without payment of compensation, including but not limited to payment of royalties.

FIELD OF THE INVENTION

This invention relates to energy storage, using electrochemical capacitor devices.

BACKGROUND OF THE INVENTION

Supercapacitors (sometimes referred to as ultra-capacitors) have received much attention recently in the technical literature, in industry and in the venture capital community, as a potential energy storage medium. This technology promises to provide a high power density (in units of kW/kg) and long cycle life (0.5-1.0 million cycles) while providing reasonable energy density (kWh/kg units). A number of companies, such as Maxwell (San Diego, USA), and Panasonic, Asahi Glass, Matsushita, NEC, and Nippon Chemicals and others, have been actively engaged in commercialization as well as advanced development. Although the technology has been around for thirty years, only recently commercial acceptance has arrived due to acceptable reliability and performance, at least for some applications such as memory backup and niche markets such as standby power mode in copying machines.

For many other commercial applications including hybrid/electric vehicles and military applications, development has a long way to go in terms of balance between power and energy densities, reliability, size, mass, safety and above all, price. Innovations in the electrode materials, electrolytes, other components, cell construction and almost everything else on cell design are on the table for further improvement. The focus in recent years has been on exploitation of nanostructured materials and principles of nanotechnology to improve the supercapacitor performance. The result so far has been promising and the performance has been steadily climbing. Nanostructured materials offer a high surface area and useable porosity for a given volume and mass, both of which are highly desirable for supercapacitor operation, which is the focus of this project.

Specifically, multiwalled carbon nanotubes (MWCNTs) have been grown in towers directly on metal alloys like nichrome, kanthal and stainless steel to reduce interface resistance; the nanotube towers will be treated quickly to improve surface wettability by the electrolyte; and if the design warrants, a psuedocapacitance component will be added by coating the MWCNT or SWCNT tower with an electrically conducting polymer (ECP). To understand all this, some background information is appropriate.

FIG. 1 (A. G. Pandolfo and A. E. Hollenkamp, Jour. Of Power Sources, vol. 157 (2006) p 11) graphically compares the specific power (Watts/Kg) versus specific energy available (Watt-hr/Kg) for four classes of energy storage devices: capacitors, electrochemical capacitors, batteries and fuel cells. High specific power and high specific energy available appear to vary inversely with each other so that one cannot have both in a single device.

Supercapacitors attempt to combine the best of capacitors and batteries to create an alternative form of energy storage device. Conventional capacitors provide a very high specific power exceeding 100 KWatts/Kg and long cycle life. The long life is due to the fact there are no chemical reactions and associated decays. However, the energy density of a commercial capacitor is small, only tens of mWatt-hr/Kg. At the other extreme, batteries provide high energy density, about 100 Watt-hr/Kg, but battery power density is about 100 Watts/Kg. An additional issue with batteries is the anticipated cycle life, limited by the chemical interconversions and concomitant phase changes. The supercapacitor, which is a hybrid between a battery and a capacitor, is not new as the first patent to SOHIO was granted in 1966 and NEC first marketed it for memory backup applications 20 years ago.

Two types of supercapacitors are available, based on how energy is stored within each device: electrochemical double layer capacitors (EDLCs) and redox capacitors. A redox capacitor, also known as a pseudocapacitor, relies on electron transfer reactions (Faraday redox) that occurs during the charge/discharge cycle of the cell and is thus not an electrostatic. Most common redox capacitors rely on oxides, such as ruthenium oxide and manganese oxide, as well as electrically conducting polymers (ECPs), such as polyaniline and polypyrrole. A chemical reaction-based operation in pseudocapacitors more nearly resembles a battery than a capacitor in its operation. In the EDLC, a pair of symmetric electrodes, usually carbon, separated by a porous medium is soaked in an electrolyte. When the electrodes are biased, ions move towards the opposite polar electrodes and charge separation is confined to a very thin region near the electrode called a double layer. In this sense, each electrode-electrolyte interface is a capacitor and, therefore, the device shown in FIG. 2 consists of two capacitors in series, with a circular pattern of high density MWCNTs. The cell capacitance is then given by $$1/C = 1/C_1 + 1/C_2, \qquad (1)$$

where C1 and C2 are capacitance values of two adjacent electrodes, each given by $$C = \in A/d \qquad (2)$$

where $\in$ is a dielectric constant for the material, A is the surface area of the carbon electrode and d is the double-layer thickness. When the electrodes are symmetric, the total capacitance is half that of a single electrode. If one electrode is far smaller than the other, the total capacitance is approximately the smaller of the two capacitance values. The energy, E and the power, P of the supercapacitor are given by:

$$E = CV^2/2, \qquad (3)$$

$$P = V^2/4R, \qquad (4)$$

where C is capacitance, V is cell voltage, and R is the equivalent series resistance (ESR).

A capacitance value is primarily determined by the surface area and pore volume. Many carbon materials, such as activated carbon and carbon aerogel, have very large surface areas ($\approx 2000 \, m^2/gm$). However, carbon materials often suffer from a significant fraction of unusable nanopores, which are pores with diameters 2 nm or less; mesopore diameters are 2-50 nm and macropore diameters are greater than 50 nm. The nanopores contribute heavily to the measured surface area but may not contribute to increasing the capacitance. Ion transport through such small pores may be restricted. Mesopores are the most ideal for supercapacitor operation. Therefore, a simple metric of large surface area from adsorption isotherm measurements alone is not adequate to evaluate various carbon forms for capacitance enhancement; pore size distribution must also be considered.

A capacitor operating voltage is determined, in part, by the choice of the electrolyte, because electrolyte stability is severely compromised above certain voltages. Aqueous electrolytes, such as acids, have an operating voltage of only 1.0-1.5 Volts but are inexpensive and exhibit high ionic conductivity. Numerous nonaqueous electrolytes, such as polycarbonate and acetonitrile, allow higher operating voltages, for example 2.5 Volts. However, their electrical resistivity is at least one order of magnitude higher than the aqueous electrolytes. According to Eq. (4), a high value for R is detrimental for obtaining high power. R consists of several contributions:

$$R = R_c + R_{em} + R_{int} + R_{elec} + R_{ion} + R_{sep} \quad (5)$$

where $R_c$ is collector metal resistance, electrode material (carbon) resistance, $R_{em}$; is resistance of the interface between the carbon and the current collector metal, $R_{int}$ is electrolyte resistance, $R_{ele}$, is resistance due to ion transport through the pores, $R_{ion}$, and $R_{sep}$. is separator resistance.

What is needed is a capacitor device that allows adequate transport between capacitor electrodes but suppresses electrical shorting between electrodes, that has a relatively low interface resistance between each electrode and any substance that physically separates the electrodes, and that has reduced capacitance, where the separator includes apparatus that can be made hydrophilic.

SUMMARY OF THE INVENTION

These needs are met by the invention, which provides a system, including (i) first and second, spaced apart planar collectors, (ii) first and second arrays of multi-wall carbon nanotube (MWCNT) towers, serving as electrodes, that extend between the first and second collectors, where the MWCNT towers are grown directly on the collector surfaces without deposition of a catalyst or a binder material on the collector surfaces, and (iii) a separator module having a transverse area that is substantially the same as the transverse area of either electrode, where (iv) at least one MWCNT tower is functionalized to permit or encourage the MWCNT tower to behave as a hydrophilic structure, with improved surface wettability.

DESCRIPTION OF PREFERRED EMBODIMENTS OF THE INVENTION

Figure 1:
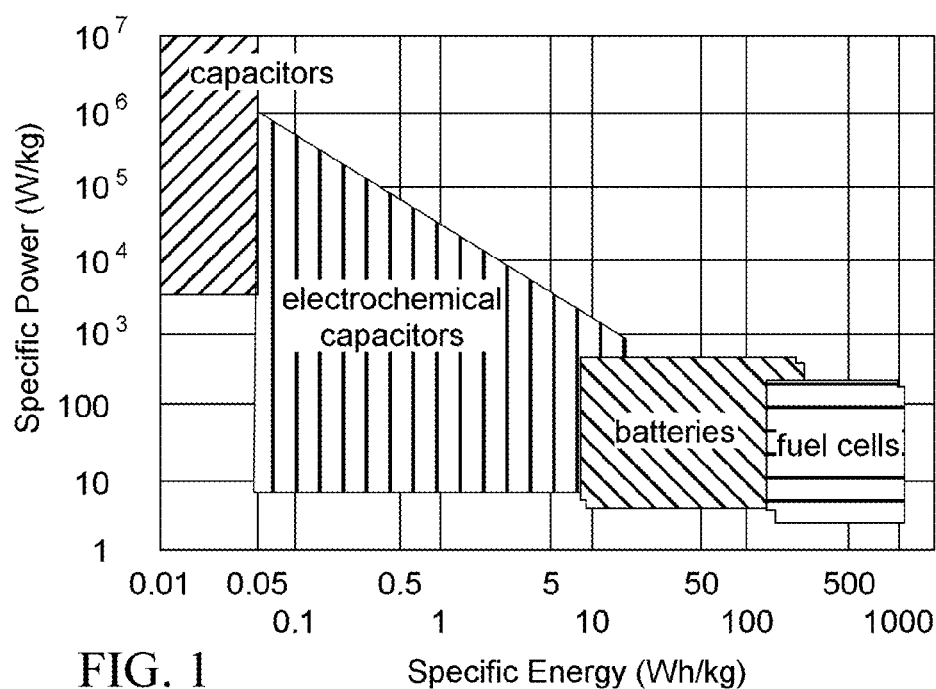
FIG. 1 graphically compares the specific power (Watts/Kgm) versus specific energy available (Watt-hr/Kgm) for four classes of energy storage devices.
Figure 2:
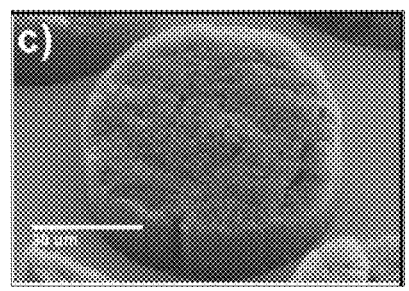
FIG. 2 is an SEM image of a patterned MWCNT array grown on a metal array surface.
Figure 3:
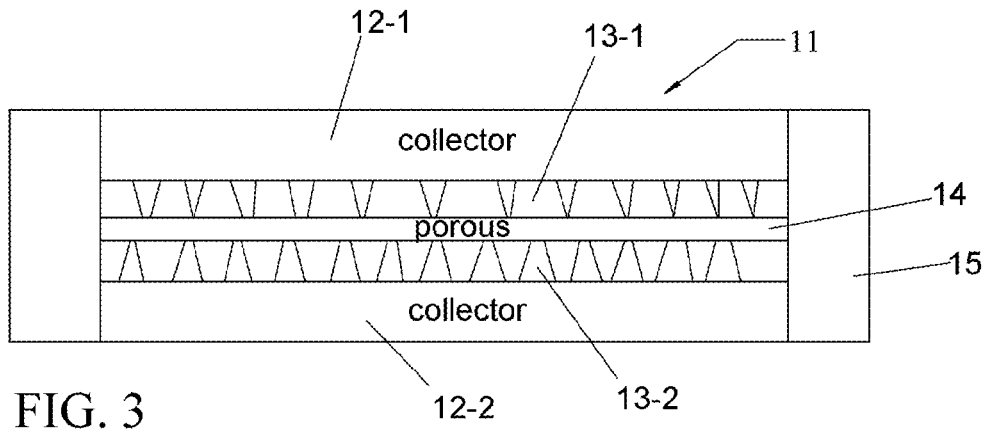
FIG. 3 schematically illustrates an embodiment of the invention.

FIG. 3 illustrates an embodiment of a supercapacitor 11 constructed according to the invention. Substantially planar, first and second collectors, 12-1 and 12-2, are spaced apart and facing each other. First and second arrays, 13-1 and 13-2 of carbon nanotube towers, of multi-wall carbon nanotubes (MWCNTs) and/or single wall carbon nanotubes (SWCNTs), serve as electrodes and are positioned contiguous to the respective first and second collectors, 12-1 and 12-2, and between the collectors. The CNT electrodes have electrode areas, A1 and A2, and are spaced apart a selected distance d. A porous separator module 14 of thickness d is positioned between the first and second electrodes, 13-1 and 13-2, with a separator transverse area A(sep) that is substantially equal each of the electrode transverse areas, A1 and A2. The separator module 14 is surrounded on its sides by a gasket 15. An electrolyte is preferably soaked into or occupies unoccupied space within the electrodes, 13-1 and 13-2.

The range of pore sizes for the separator module 14 is chosen (i) to facilitate charged particle transport between the electrodes, 13-1 and 13-2, and (ii) to suppress electrical shorting between the electrodes. The porous separator module 14 may be of conventional design and materials, such as celgard, polypropylene membrane, glass fiber, cellulose fiber and similar materials. Optionally, a spacer 16 surrounds the gasket 14 and holds the first and second collectors, 12-1 and 12-2 apart.

The CNTs that comprise the electrodes, 13-1 and 13-2, are grown directly on the collectors, 12-1 and 12-2 without depositing a catalyst, such as Fe or Ni or Co, to enhance this growth, and without using a binding material. The collector material is preferably nichrome, kanthal, stainless steel or a similar material containing at most trace amounts of iron, nickel or cobalt. In the absence of a catalyst deposited on the collectors, the interface resistance R(int) between an MWCNT and a contiguous collector surface is reduced substantially, and catalyst impurities are no longer present.

A variety of carbon materials have been used in the past to construct super-capacitors. This innovation uses carbon nanotubes (CNTs), single-wall carbon nanotubes (SWCNTs) and, preferably, multiwalled nanotubes (MWCNTs). These MWCNTs have been found to be superior in many ways: their conductivity is very high relative to other forms of carbon, thus providing a relatively small value of $R_{em}$ in Eq. (5). MWCNTs also have a highly porous structure characterized by sizeable fraction of mesopores (diameters 2-50 nm), have good useable surface area, and are stable and chemically inert.

One of the biggest problems to date with use of CNTs in supercapacitors is presence of a high interfacial resistance, $R_{int}$ in Eq. (4), which can dominate all other components. Typically, MWCNTs and SWCNTs are mixed with a binder and applied as a paste onto the collector metal. This procedure adds a problem: the binder material adds to the weight but adds nothing to the capacitance value. Applying a paste to the collector does not allow thickness control, and it is difficult to obtain thickness values less than 0.3-0.5 mm. The associated interface resistance $R_{int}$, with a paste applied, is high. There is evidence that direct growth on the collector can help to reduce the interface resistance. The innovation disclosed and claimed here does not involve deposition of a catalyst, such as Ni, Fe or Co layers, which would also add to the resistance problem.

The growth of MWCNT and/or SWCNT towers will be done directly on polished, ultra-smooth alloy substrates containing Fe and/or Ni, such as nichrome, kanthal and stainless steel. The growth process for generating an MWCNT pillar or tower array requires heating the collector metal substrate in an inert Ar gas atmosphere to 750° C. After thermal equilibration, 1000 sccm of 8/20 ethylene/Hs gas flow results in the growth of CNT towers. The height of the structures may be controlled with time of reaction.

CNTs are normally hydrophobic, and when using (liquid) electrolytes, surface wettability becomes an issue. CNTs can be made hydrophilic in several ways. Surface functionalization, such as treatment with fluorine, chlorine or ammonia, is known to improve surface wettability. Eliminating oxygen groups is equally important because these groups add resistance to charged particle transport. The invention uses a plasma discharge to quickly treat (within a few minutes) the CNT surfaces with $NH_3$ or $F_2$ to improve wettability. This is relatively fast, relatively inexpensive, scalable, and eliminates use of expensive chemicals and hazardous waste disposal issues associated with conventional wet chemical methods used for functionalization.

CNTs are hydrophobic materials and therefore wetting could be an issue when using aqueous electrolytes and even other electrolytes. Any surface treatment that increases the contact angle would be helpful as long as the approach is quick, inexpensive and does not introduce other unwanted problems.

Previously, functionalized SWCNT bundles have been used with $H_2$, $NH_3$ and $F_2$ (or $CF_4$) respectively. In all these cases, complete surface coverage was found to occur within about two minutes, as evidenced by the unchanging intensity of the observed peak (such as the C—H bond). This type of plasma, commonly used in semiconductor industry, is amenable to automation where the electrode from the CVD chamber can be passed onto the plasma chamber next.

Another issue can arise, when CNTs, acting as a nonpolar material, tend to aggregate or segregate easily in a polar solvent. This is an issue for consideration if loose bundles of nanotubes with binder are used. The use of MWCNT tower electrode may not face this as a serious problem. In any case, CNT surface functionalization with fluorine or ammonia is known to avoid this problem.

In one embodiment, the electrode is treated first for a few minutes under an argon plasma to drive out surface oxygen. This is followed by $NH_3$ or $F_2$ plasma to increase the contact angle/wettability and surface area of the MWCNT tower.

Surface oxygen increases the resistance of CNTs and they can also contribute to leakage currents. Typically high temperature treatment in an inert environment is used to eliminate the surface oxygen.

One can add a pseudo-capacitance component by modifying an array of CNTs, either by loading with oxide particles or by coating with electrically conductive polymers (ECPs). Here, the Faraday behavior of this addition is known to become attenuated with the passage of time, where this approach is combined with use of activated carbons. A trade-off between capacitance performance and capacitance endurance requires optimization. MWCNTs provide unique opportunities for coating with an ECP, such as polypyrrole, and for retaining the coating in the pores over a long period.

The capacitor charging time is primarily contributed by RC charging and ionic mass transport. The device capacitance value C is determined from Eqs. (1) and (2), and the equivalent series resistance is given by Eq. (5). It is assumed that an electrode area L×W (which is the geometrical area and different from the total surface area of the porous electrode), separation distance of a between the electrodes and equal area or symmetric electrodes.

For highly useable power density, the RC time constant must be reduced as much as possible, the specific capacitance must be increased, and the ionic transport time must be reduced. These requirements indicate a need to make the electrode thinner Currently carbon cloth electrodes and similar preparations make electrode thicknesses in a range of 0.3-0.5 μm. Chemical vapor deposition (CVD) can grow towers as small as 5 μm tall and as tall as 1000 μm, for a range of tower thicknesses. Thin MWCNT or SWCNT towers allow a reduction of $R_{em}$ in Eq. (5) directly. Faster mass transport through thin(ner) electrodes also reduces $R_{ion}$ in Eq. (5).

Typically, collectors are metal sheets with small resistance. Reduction of interface resistance $R_{int}$ is achieved here through direct growth of MWCNT or SWCNT towers on a collector. Bulk produced materials also require clean up of amorphous carbon and catalytic impurities, which together can account for 30 percent or more of total weight. Purified material is much more expensive; and a temptation exists to use unpurified material due to its lower cost. The impurities present may interfere with device performance and add to the cell weight without contributing to the performance. By contrast, the direct growth eliminates most of these problems; conventional growth using catalysts is not desirable.

Another critical aspect of the electrode is its surface area, because the double-layer capacitance increases with area as in Eq. (2). Unlike a conventional capacitor where the area is the geometrical area of the collector plate, the area in the supercapacitor design disclosed here uses the porous areas of the carbon electrode; this increases the area beyond what the geometry would normally allow. However, care is needed in measuring and interpreting surface area, which is typically done using $N_2$-adsorption isotherm measurements or the so-called BET adsorption isotherm. Although $N_2$ can pass through the smallest of the pores as a gas, passage of ions through the pores is not as easy because the ions are larger. The micropores, having diameters less than 2 nm, contribute heavily to the measured area but these apertures are useless for ion transport. Most of the activated carbons with impressive surface areas suffer from this problem of too many micropores. Macropores, with diameters greater than 50 nm, do not contribute much to the measured area and simply serve to connect to the collector edges and separator module in the extremities.

Ideally, a substantial fraction, at least 30 percent, of the total area would be associated with the mesopores (2-50 nm) MWCNTs with their central cavities meet this need. Further, the growth density in the MWCNT towers can be controlled with optimum mesopore distances between nanotubes as well. This approach appears to provide an optimum combination of $R_{int}$, surface area, and pore accessibility. Because bulk materials are not used, cost issues associated with purification, binder addition and adhesive addition are eliminated. Direct growth and assembly line operation reduce the cost concerns associated with typical electrode construction.

The choice of electrolyte determines the value of $R_{elec}$ in Eq. (5), which will affect the power density. Beyond that, the operating voltage is primarily determined by the stability of the electrolyte during operation. Common aqueous electrolytes include 38 percent sulfuric acid or potassium hydroxide, for example. These electrolytes are characterized by low resistance (0.2-0.5 Ohms/cm$^2$) or 1-2 Ohm-cm resistivity. This reduces $R_{elec}$ in Eq. (5). Aqueous electrolytes allow rapid charging and discharging, which is necessary for high power applications. Electrolyte stability, however, requires an operating voltage that does not exceed 1 Volt. From Eq. (3), this limits the energy density.

There are several organic electrolytes such as propylene carbonate, and acetonitrile and its compounds, which have much higher decomposition threshold up to 3 Volts; this will yield a factor of 9 higher energy density than with aqueous electrolytes according to Eq. (3). However, the organic electrolytes exhibit a higher resistance of 1-2 Ohms/cm$^2$, equivalent to 20-60 Ohm-cm resistivity, which substantially affects the power. Some organic electrolytes, such as acetonitrile, are toxic and can release cyanide when burning.

The electrolyte choice cannot be made independently but must be consistent with electrode design. Typically, organic electrolyte ions are larger and thus require larger pores for efficient transport. The MWCNT tower electrode used here are believed to easily accommodate transport of such large ions and also possibly help to achieve a level of 3.0 Volt operation.

Another attractive electrolyte class is room temperature ionic liquids (RTILs), which are a much better alternative to organic electrolytes. RTILs have no solvent, are composed of only ions, and thus provide an even higher potential window (up to 5 Volts) than do organic electrolytes. The intrinsic resistance of an RTIL is also lower, and the flammability, toxicity and volatility characteristics are less troublesome Use of a porous separator prevents shorting of the electrodes while providing access to transport. Equation (5) demands a thin (but stable) separator made of a low resistance material. Available choices include polymers, such as celgard, polypropylene membrane, glass fiber, cellulose fiber and similar materials.

What is claimed is:

1. A method for producing a supercapacitor, the method comprising:
    providing first and second substantially planar collectors, having respective first and second collector surfaces facing each other and spaced apart a selected distance apart
    growing spaced apart first and second arrays of single wall carbon nanotube (SWCNT) towers or multi-wall carbon nanotube (MWCNT) towers directly on the first and second collector surfaces, with no catalyst substance and no binder material deposited on the collector surfaces, the towers having heights in a range of about 10-1000 µm;
    positioning a porous separator module, having a substantial portion of its pores with diameters in a range 2-50 nm, between and contiguous to the first array and the second array of towers, the separator module having a thickness no greater than a height of a nanotube tower and having a separator module transverse area A(sep) that is substantially equal to a transverse area A(el) of at least one of the first and second collector surfaces;
    functionalizing at least one MWCNT tower or SWCNT tower to increase surface wettability of the at least one tower.

2. The method of claim 1, further comprising functionalizing said at least one tower by addition to a tower surface of molecules of at least one of F and $NH_3$, to thereby eliminate or reduce a number of oxygen groups attached to said nanotube towers.

3. The method of claim 1, further comprising functionalizing said at least one MWCNT by a process comprising exposing said at least one MWCNT to a low temperature plasma discharge in presence of at least one of F and $NH_3$.

4. The method of claim 1, further comprising including in at least one of said first and second collector surfaces an electrically conductive material drawn from a group consisting of nichrome, kanthal and stainless steel.

5. The method of claim 1, further comprising choosing said separator module to include at least one of celgard, polypropylene membrane, glass fiber and cellulose fiber.

6. The method of claim 1, further comprising providing an electrolyte for said supercapacitor that replaces a common aqueous, organic molecule by at least one room temperature ionic liquid.

7. The method of claim 1, further comprising coating at least one of said nanotube towers with an electrically conducting polymer.

8. The method of claim 7, further comprising choosing said electrically conducting polymer to comprise polypyrrole.

* * * * *